United States Patent [19]

Kornhaber et al.

[11] Patent Number: 4,665,116
[45] Date of Patent: May 12, 1987

[54] CLEAR CLEANER/POLISH COMPOSITION

[75] Inventors: Harvey Kornhaber, Palos Park; James P. Heidel, Downers Grove; Stephen I. Varga, Evanston, all of Ill.

[73] Assignee: Turtle Wax, Inc., Chicago, Ill.

[21] Appl. No.: 770,100

[22] Filed: Aug. 28, 1985

[51] Int. Cl.$^4$ ................................................. C08K 5/54
[52] U.S. Cl. .................... 524/268; 524/269; 524/731; 524/855
[58] Field of Search ............... 524/268, 269, 731, 855

[56] References Cited

U.S. PATENT DOCUMENTS

| | | | |
|---|---|---|---|
| 2,597,871 | 5/1952 | Iler | 106/10 |
| 2,746,876 | 5/1956 | Mills | 106/10 |
| 2,804,440 | 8/1957 | Brown | 524/268 |
| 2,839,482 | 6/1958 | Geen et al. | 524/269 |
| 2,937,129 | 5/1960 | Garwood | 585/18 |
| 3,037,886 | 6/1962 | Ryznar | 106/3 |
| 3,249,461 | 5/1966 | Grotenhuis | 524/855 |
| 3,364,161 | 1/1968 | Nadler | 524/731 |
| 3,795,646 | 3/1974 | MacKenzie, Jr. et al. | 524/269 |
| 3,890,269 | 6/1975 | Martin | 528/34 |
| 3,960,575 | 6/1976 | Martin | 106/11 |
| 4,209,432 | 6/1986 | Roth | 524/269 |
| 4,247,330 | 1/1981 | Sanders, Jr. | 106/3 |

FOREIGN PATENT DOCUMENTS

| | | | |
|---|---|---|---|
| 569776 | 1/1959 | Canada | 524/268 |
| 56-95663 | 8/1981 | Japan | 524/268 |
| 57-162768 | 10/1982 | Japan | 524/268 |

*Primary Examiner*—Joseph L. Schofer
*Assistant Examiner*—N. Sarofim

[57] ABSTRACT

A non-aqueous, cleaner/polish composition that is substantially visually clear and contains a microparticulate, amorphous pyrogenic silica as a mildly abrasive polishing and thickening agent, a film-forming agent, a film plasticizer, a volatile silicone gloss agent, and aliphatic solvent cleaning agents.

13 Claims, No Drawings

CLEAR CLEANER/POLISH COMPOSITION

DESCRIPTION

1. Technical Field

This invention relates to non-aqueous, substantially visually clear, compositions suitable for one-step cleaning and polishing of metal surfaces, particularly automobile finishes. More particularly, the compositions contain a microparticulate, pyrogenic amorphous silica as a mildly abrasive polishing and thickening agent, a film-forming agent, a film plasticizer, a volatile silicone gloss agent, and aliphatic solvents.

2. Background Art

Although modern acrylic car finishes are more durable than the older alkyd or nitrocellose finishes formerly used, they still suffer from the deteriorative effects of environmental weathering, such as surface oxidation of the painted film from sunlight, crazing from cracks in the color coat, discoloration from soot and other atmospheric contaminants and water spotting. Thus, there is still a need for cleaning and polishing compositions for automobile finishes designed to remove road film and oxidized paint without stripping off or otherwise adversely affecting the car's finish.

Modern car finishes are a combination of a base coat containing either pigments or metallized aluminum flake and a clear acrylic top coat. A "one-step" polish cleans and shines the finish on an automobile surface in a single applicational step and thus combines the advantages of cleaners and polishes that require two applicational steps. Conventionally, a car "cleaner" contains fine abrasives intended to remove road dirt, insects, tree sap, etc., and a "polish" contains milder abrasives for removing deep stains and scuff marks. The clear top coat finish can be scratched, dulled, and/or removed by conventional abrasive-containing one-step cleaner/polishes, however.

Conventional one-step car polishes may be either solvent-based or aqueous emulsions in solid, semi-solid or liquid form. These products usually contain as functional ingredients: abrasives, straight- and branched-chain aliphatic hydrocarbon solvents, waxes, silicones, and water.

For example, emulsion compositions containing about 1–3 percent silicone polymers, commonly known as silicone fluids, are known in the art to improve wax film lubricity and gloss, and to prepare water-resistant hydrophobic coatings on hard metal surfaces, such as automobile finishes. So-called "Premium" quality products sometimes include about 4–7 percent silicone polymers that are amino-functional organopolysiloxanes in place of waxes to provide a finish having durability and increased resistance to detergents.

Representative conventional liquid emulsion products known in the art may contain 10–15 weight percent abrasive, 10–30 weight percent solvent, 2–12 weight percent silicone and 0–4 weight percent wax. A representative emulsion paste product may contain similar amounts of the foregoing functional ingredients, except that the wax content may be about 3–15 weight percent.

Abrasives known in the art are crystalline particulate materials, such as Neuberg chalk, diatomaceous earths, amorphous silicas, aluminum silicates, clays and the like. In order to effectively clean and polish large soiled surfaces like those provided by automobiles, an abrasive must be used having an average particle size of about 0.1 to about 7 microns (about 100 to 7000 nanometers). However, these particulates may scratch the modern acrylic finishes on automobiles during the process of cleaning and polishing.

Another disadvantage of the foregoing abrasives is that they tend to settle out of the medium in liquid emulsion products. While the abrasives may be resuspended by shaking the product for use, they frequently resettle too rapidly thereafter to deliver a substantially identical composition at each application. This problem leads to loss of cleaning and polishing efficiency with uneven results.

Attempts to overcome the foregoing problem have been made by formulating abrasive material-containing compositions as highly viscous paste solids or semi-solids. Although this product form prevents the abrasive ingredients from settling, they are cumbersome to use and tend to result in an uneven streaked finish. Further, these problems are more pronounced where the product is a solvent-based wax paste, and the product is applied to a warm or hot automobile surface, i.e., in direct sunlight.

Particulate materials composed of ultimate particles or structural units having an average particle size of less than 0.1 micron (less than 100 nanometers) are commercially available and are known in the art as microamorphous silica. These silicas have high surface areas of generally greater than 3 square meters per gram. Microamorphous silica includes colloidal silica sols, silica gels, and precipitated particulate silicas.

Microamorphous silica can be further divided into finely divided microparticulate silica having substantially no measurable hardness values. These microparticulates include, commercially available pyrogenic or fumed silicas formed by condensing silicon dioxide from a vapor phase and silicas precipitated from aqueous solution. A description and comparison of various amorphous silicas is found in Kirk-Othmer, *Encylopedia of Chemical Technology*, Third Edition, Volume 20, pages 766–781, published by John Wiley & Sons, 1982 (hereafter "Kirk-Othmer"), the disclosures of which are incorporated herein by reference.

It would be useful and desirable to utilize a finely divided microparticulate pyrogenic amorphous silica in one-step cleaner and polish compositions as a principal "mildly abrasive", yet nonscratching polishing agent for modern automobile finishes.

U.S. Pat. No. 2,597,871 issued to Iler teaches the use of aqueous wax-containing polishing emulsions containing alkali-stabilized colloidal silica in the form of dispersed particles having a particle size of 1 to 100 millimicrons (expressed hereinafter by the term "nanometers"), preferably having an ultimate particle size less than about 30 nanometers, to improve the luster of normally low gloss coatings and the skid resistance of the dried film. The proportion of colloidal silica taught by Iler in aqueous dispersions varied with the amount of wax present, from about 3 to 9 weight percent in dispersions containing from about 10 to 15 percent of wax, to about 18 percent in paste compositions containing from 20 to 40 percent of wax in the total composition. However, colloidal amorphous silicas are usually hydrophilic and moisture absorption can induce changes in the silica structure, especially in that of a pyrogenic silica, resulting in adverse changes in the rheology of the liquid medium.

Mills in U.S. Pat. No. 2,746,876 teaches the use of a minor amount of finely divided colloidal hydrophobic silica having a particle size of less than 0.1 micron (100 nanometers) average diameter to increase the hardness of oxidized microcrystalline waxes prior to their being incorporated into aqueous emulsion polish compositions. Mills teaches, however, that silicas having such small particle sizes are completely non-abrasive.

The high surface area of microparticulate amorphous silica is known to make such particle suitable absorbents not only of moisture but of oils and greasy films. Ryzner in U.S. Pat. No. 3,037,886 teaches colloidal silicas dispersed in water or in hydrophilic liquids to be used as slurry or pasty suspensions or sols for removing carbonaceous deposits from metals. Ryzner teaches, as useful cleaners, finely divided silicas having a surface area of at least 25 square meters per gram and an ultimate particle diameter in the range of from about 1 to about 100 nanometers. However, the Ryzner metal cleaning process is a multiple-step one in which the 25 colloidal silica sols are used in a first step as adjunct cleaners, but not polishing agents, to a subsequent second step of solvent cleaning, emulsion cleaning, vapor degreasing or alkali cleaning.

In addition to the forementioned functional ingredients, modern car polishes usually also contain surface-active agents, emulsifiers, thickeners, and stabilizers needed to produce a homogeneous stable product of a desired consistency that does not sag or run off vertical surfaces. These ingredients, however, have the disadvantage of dulling the surface film provided by one-step products of the rub-to-polish type which are not normally rinsed from the polished surface. Traditionally, a rub-to-polish type product has been preferred because it produces the highly desirable "paste wax" shine associated with a premium cleaner/polish composition.

Another disadvantage of conventional emulsion and paste polishes is that the wax and emulsifying ingredients usually render them opaque. An opaque product makes it difficult for the user to see how much buffing or rubbing is actually needed to remove soil and/or shine the underlying coated surface finish. This disadvantage increases the risk of scratching or removing the top coat finish being treated on an automobile or metal surface.

It would be useful and desirable, therefore, if a non-aqueous, substantially visually clear one-step cleaner/polish composition could be prepared utilizing a microparticulate pyrogenic amorphous colloidal silica as both the principal polishing agent and non-dulling thickener, as well as auxiliary cleaning agent. The present invention provides such a composition having the consistency of either a concentrated gel or a liquid suitable as a premium quality rub-to-polish type cleaner/polish product.

SUMMARY OF THE INVENTION

The present invention relates to a non-aqueous, substantially visually clear cleaner/polish composition suitable for one-step cleaning and polishing of hard metal surfaces, particularly clear acrylic-coated automobile finishes. More particularly, the present cleaner/polish composition has the consistency of a gel or viscous liquid comprising, as a principal mildly abrasive polishing agent, a principal thickening agent and as an auxiliary cleaning agent, a microparticulate, amorphous, pyrogenic, hydrophilic silica having an average primary particle size in the range of from about 3 to about 50 nanometers, an external BET surface area as defined hereinbelow of about 50 and about 500 square meters per gram, an internal surface area that is substantially nil and a silicon dioxide content greater than 99.8 percent. The polish composition is further comprised of at least one film-forming agent, a film plasticizer, at least one volatile silicone gloss agent, and a substantially de-aromatized organic aliphatic solvent as cleaning agent and diluent.

The composition may be used to clean and polish a metal substrate, such as an automobile finish in the manner disclosed herein. The composition is applied in a thin layer onto a substantially dry surface substrate. To this end, a relatively small amount of about 2 to about 4 grams per 2 square foot area is spread over the surface using a circular and overlapping stroking motion to provide a substantially clear thin coating on the substrate. This coating is subsequently dried under ambient atmospheric temperature and humidity conditions for a period of time sufficient for the substantially visually clear coating to develop a faint whitening haze. The surface is then buffed by wiping the resulting faintly hazy coating from the substrate surface with substantially no heavy rubbing pressure thereon, leaving a shiny durable polished finish thereon.

The terms "abrasive" and "polish" are used herein in their commonly understood meanings as defined in Hampel, et al., *Glossary of Chemical Terms*, published by Van Nostrand Reinhold Company, N.Y., 1976, incorporated herein by reference. The term, "mildly abrasive" is used herein to describe the amorphous pyrogenic silica as a microparticulate buffing agent, having a hardness value that is too soft to be measured as a hardness value on the well-known Mohs scale, capable of smoothing and polishing the surface of a metal substrate to give it a brilliant decorative finish or to remove minor imperfections therefrom.

The term "metal surface" as used herein includes enamel-coated or acrylic-coated metal surfaces whether pigmented or non-pigmented, but does not include metal surfaces painted with flat paint. In its presently preferred use, a composition of this invention is used to treat metal surfaces, such as those provided by an automobile finish, but is not so limited.

The present composition can be used to clean and polish uncoated, bare metal surfaces, such as surfaces provided by chrome hardware, airplane finishes, bicycles, snowmobiles, motorcycles, boats and the like. It can also be used to clean and polish hard non-metal surfaces on which a durable polished shine is desired, but which may be scratched by conventional abrasives, for example, fiberglass structures, polycarbonate and acrylic plastic typically provided by the body exteriors and interiors of automobiles, boats, sport vehicles and the like.

In one aspect of this invention, a preferred composition comprises in the total composition (a) about 3 to about 10 parts by weight of a mildly abrasive polishing agent and thickening agent that is a microparticulate, amorphous, pyrogenic hydrophilic silica having an average particle size of about 7 to about 20 nanometers and an external BET surface area of about 90 to 425 square meters per gram and a silicon dioxide content greater than 99.8 percent;

(b) about 0.1 to about 5 parts by weight of at least one film-forming agent selected from the group consisting of amino-functional dialkylpolysiloxanes, curable resins, liquid hydrocarbon polymers obtained from mono-olefins having a total of 3 to 20 carbon atoms, inclusive, in the mono-olefin molecule, and mixtures thereof;

(c) about 0.2 to about 0.5 parts by weight of at least one film plasticizer for the film-forming agent selected from the group consisting of polyoxy($C_2$–$C_4$)alkylenes having an average of about 9 to about 40 oxyalkylene units per molecule and microcrystalline hydrocarbon waxes;

(d) about 5 to about 15 parts by weight of at least one volatile organopolysiloxane gloss agent that is selected from the group consisting of linear fully methylated, trimethylsilyl endblocked polysiloxanes having a viscosity value in the range of about 350 and about 60,000 centistokes at 25 degrees C. (77 degrees F.) and cyclic dimethylpolysiloxanes having an average of 3 to 7 dimethylpolysiloxy groups per molecule; and (e) an aliphatic, substantially de-aromatized organic solvent present in sufficient amount to dissolve the polishing agent, the film-forming agent, the film plasticizer and the gloss agent, and having an average kauri-butanol value of about 20 to about 50 and a refractive index value of about 1.3 to about 1.5.

The present invention has many benefits and advantages. A particular advantage is that, notwithstanding the relatively small particulate size (i.e., less than 100 nanometers) of the mildly abrasive amorphous silica present, the composition of this invention can provide a polished finish, normally attainable only by cleaners and polishes containing abrasives of relatively larger particulate size (i.e., greater than 100 nanometers), and can do so without scratching the metal surface.

Another advantage is that a composition of this invention, unlike conventional cleaner/polish compositions, is substantially visually clear, thereby allowing the user to see how much cleaning and/or rubbing action, if any, is needed. An added benefit is that a composition of this invention may be in the form of a concentrated gel or viscous liquid so that, unlike conventional emulsion type cleaner/polish compositions, the consistency of the product is non-runny and no wasteful loss of product results from sag or run-off on vertical surfaces.

A still further benefit is that a concentrated composition of this invention provides the desirable finish benefits usually associated with a solvent-based "paste wax" shine without the attendant streaking usually experienced with wax-containing products, and can be applied to metal surfaces of automobiles in either the sun or in the shade. Further a composition of this invention provides the applicational ease of an aqueous emulsion product without the attendant dripping, dulling and water-spotting connected therewith.

A particular benefit of the present invention is that it provides a premium rub-to-polish type product of exceptionally good performance in regard to the speed and smoothness of the application as well as the gloss and durability of the resultant finish.

Yet another benefit of the present invention is that the heavy rubbing usually associated with achieving a durable shine on polishing a metal substrate, particularly an automobile surface, is not required. Only a thin coat of cleaner/polish composition need be applied and then wiped away to obtain a high-gloss, detergent-resistant finish providing still another economic benefit.

Still further benefits and advantages of the present invention will be apparent to those skilled in the art from the detailed description and examples that follow.

DETAILED DESCRIPTION OF THE INVENTION

Cleaner/polish compositions of this invention may be applied to the body surface of an automobile or other similarly hard metal surface substrate, including those that are acrylic-coated or enamel-coated, whether pigmented or unpigmented, but not those painted with flat paint. While these compositions may also be applied to fiberglass and acrylic plastic surfaces sometimes provided by cars, boats, sports vehicles, such as snowmobiles and motorcycles, and the like, an automobile surface will be utilized as an exemplary substrate in the following description and examples, without the present invention being so limited.

A cleaner/polish composition of this invention is a non-aqueous, substantially clear gel or viscous pourable liquid comprising as functional ingredients:

(a) a mildly abrasive polishing and thickening agent that is a microparticulate, amorphous, hydrophilic pyrogenic silica having an average primary particle size in the range of about 3 to about 50 nanometers, an external BET surface area of about 50 to about 500 square meters per gram, an internal surface area that is substantially nil and a silicon dioxide content of greater than 99.8 percent, said polishing and thickening agent also being an auxiliary cleaning agent;

(b) at least one film-forming agent that is selected from the group consisting of amino-functional dialkylpolysiloxanes, curable resins, liquid hydrocarbon polymers obtained from mono-olefins having 3 to 20 carbon atoms, inclusive, in the mono-olefin molecule and mixtures thereof;

(c) at least one film plasticizer for the film-forming agent selected from the group consisting of polyoxy($C_2$–$C_4$)alkylenes having an average of about 4 to about 90,000 oxyalkylene units per molecule and microcrystalline hydrocarbon waxes;

(d) at least one volatile organopolysiloxane gloss agent that is selected from the group consisting of linear fully alkylated and trialkylsilyl endblocked polysiloxanes and cyclic dialkylpolysiloxanes where the alkyl group contains 1 to 3 carbon atoms, inclusive; and (e) an aliphatic substantially de-aromatized organic solvent present in sufficient amount to dissolve the polishing and thickening agent, the film-forming agent, the film plasticizer, and the gloss agent, the solvent having an average kauri-butanol value of about 20 to about 50 and a refractive index value of about 1.3 to about 1.5.

The term "cleaner/polish" as used herein refers to a composition that can clean and provide a shiny finish on a hard metal and hard non-metal acrylic plastic, polycarbonate, fiberglass or polyurethane substrates in a single applicational step. A cleaner/polish composition of this invention in terms of performance would commonly be classified as a one-step premium quality, rub-to-polish type product.

The term "substantially visually clear" as used herein denotes a product that, optically, is visually clear to the unaided eye, and preferably corresponds to a refractive index value of about 1.3 to about 1.5, more preferably near the refractive index value of the microparticulate pyrogenic amorphous silica which is reported to be 1.452.

The term "amorphous" as used to describe silica denotes a lack of crystal structure, as it is commonly defined in the art based on known X-ray diffraction techniques reported in Kirk-Othmer hereinbefore identified. The term "microparticulate" as used herein to describe a "pyrogenic or fumed" silica (hereafter "microparticulate silica") denotes a silica having a silicon dioxide content reported to be greater than 99.8 percent based on material ignited for 2 hours at 1000 degrees C. (1832 degrees F.). A useful microparticulate silica has a primary particle size of less than 100 nanometers, and an average primary particle size in the range of about 3 to about 50 nanometers, preferably about 7 to about 20 nanometers.

Any pyrogenic silica may be used that is reported by the supplier as having the foregoing particle size distribution and characterized by having an internal surface area that is substantially nil, and an external surface area of about 50 to about 500 square meters per gram, preferably of about 90 to about 425 square meters per gram, more preferably about 175 and 225 square meters per gram.

The foregoing values for surface area are determined by the well-known nitrogen absorption method described by Brunauer, Emmett and Teller in the *J. Amer. Chem. Soc.*, Vol. 60, page 309, 1938, incorporated herein by reference, and referred to herein as BET surface area.

A particularly preferred microparticulate silica is commercially available having specific surface areas in the range desired, and is sold under the trademark AEROSIL ® by the Degussa Corporation, Teterboro, N.J., and under the trademark, CAB-O-SIL, by the Cabot Corporation, Tuscola, Ill., a Degussa licensee. According to the supplier, AEROSIL ® silica is obtained from the hydrolysis of silicon tetrachloride in an oxygen-hydrogen flame by manufacturing processes disclosed in a number of German and U.S. patents. A listing of these patents is found in *Dequssa's Technical Bulletin Pigments*, No. 11, "Basic Characteristics and Applications of AEROSIL ®", 3rd edition, October 1982, the disclosures of which are incorporated herein by reference. The fumed or pyrogenic silica prepared by these methods is described as a coagulated silicon dioxide with spherical particles in the range of 10 to 20 nanometers average diameter. A particularly preferred AEROSIL ® silica is AEROSIL ® 200, reported to have an average particle size of 12 nanometers and an external BET surface area of about 175 to about 225 square meters per gram.

A particularly preferred embodiment of this invention comprises in the total composition about 3 to about 10 parts by weight of a microparticulate, amorphous, hydrophilic pyrogenic silica as the principal mildly adhesive polishing and thickening agent, and as an auxiliary cleaning agent. The proportion of microparticulate silica may be varied as desired to obtain a product having the consistency of either a gel or a viscous liquid. A useful amount of microparticulate silica for preparing a composition in the form of a gel may be in the range of about 6 to about 10 parts by weight of the total composition preferably in the range of about 6 to about 9 parts by weight. Useful amounts of microparticulate silica for preparing a composition in the form of a viscous liquid may be in the range of about 3 to about 5.9 parts by weight of the total composition, preferably in the range of about 4 to about 5 parts by weight.

The term "gel" as used herein denotes a thixotropic product having a final viscosity of about 300,000 to about 900,000 centipoise (cp.), preferably from 500,000 to 700,000 cp., as measured by the well-known rotational Brookfield Viscometer (hereafter "Brookfield viscosity"). The term "viscous liquid" as used herein denotes a pourable non-runny product having the pouring-consistency similar to that of molasses corresponding to a final Brookfield viscosity of about 25,000 to about 75,000 cp., preferably about 45,000 to about 60,000 cp.

Those skilled in the art will appreciate that the thickening efficiency of microparticulate silicas varies according to the nature of the media, and can be readily determined by routine experimentation.

The compositions of this invention contain, on an active basis of the total composition, about 0.1 to about 5 parts by weight, preferably about 2.5 to about 3.5 parts by weight, of at least one film-forming agent. Particularly useful film-forming agents are silicone fluids that include an amino-functional dialkylpolysiloxane as a major constituent, curable resins, and liquid hydrocarbon polymers obtained from mono-olefins having between 3 and 20 carbon atoms in the mono-olefin molecule.

Amino-functional silicone fluids useful as film-forming agents herein, are preferably selected from the group consisting of water-insoluble, water-hydrolyzable and reactive amino-functional dialkylpolysiloxanes. These silicone fluids may contain starting materials and reaction products in addition to the amino-functional dialkylpolysiloxane. However, the alkyl substituents on the silicon atoms of the silicone fluid are substantially those of the dialkylpolysiloxane reactants. A useful amino-functional dialkylpolysiloxane, for example, can be derived from the equilibration of a dialkylpolysiloxane having a viscosity of about 1 to about 30,000 centistokes (cs.) at 25 degrees C. (77 degrees F.) and an amino-functional silane or siloxane in the presence of a basic catalyst.

A preferred dialkylpolysiloxane utilized in the preparation of the amino-functional dialkylpolysiloxane is a cyclic compound represented by the formula:

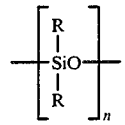

wherein R is an alkyl radical having about 1 to about 18 carbon atoms, and n is an integer whose value is about 3 to about 10. Examples of suitable cyclic dialkylpolysiloxanes which may be used in the formation of these amino-functional dialkylpolysiloxanes are hexabutylcyclotrisiloxane, octamethylcyclotetrasiloxane, decamethylcyclopentasiloxane, dodecamethylhexasiloxane, tetradecaethylcycloheptasiloxane, hexadecamethylcyclooctasiloxane, and the like. Cyclic siloxanes of the above formula in which n has a value of about 3 to about 4 are preferred. It is particularly preferred that R be methyl.

Another group of preferred polysiloxanes are those compounds whose repeating units have the general formula:

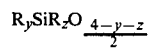

in which R is as disclosed above, y is a number having a value of about 0.5 to about 3.0, z is a number having a value of 0.001 to about 1, and the sum of y and z is a number having a value of about 1 to about 3.0. Exemplary of the foregoing linear or branched chained siloxanes which are useful are the trialkylsiloxy end-blocked dialkylpolysiloxanes such as trimethylsiloxy or triethylsiloxy end-blocked dimethylpolysiloxanes, diethylpolysiloxanes, methylbutylpolysiloxanes, dioctylpolysiloxanes and the like. The trimethylsiloxy end-blocked dimethylpolysiloxanes are particularly preferred.

The amino-functional silanes or siloxanes which are reacted with the dialkylpolysiloxanes may be represented by the general formula:

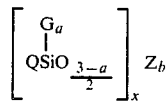

wherein G represents the radicals R, OR", NR'$_2$, or OSiR$_3$ in which R is the same as R above, R' represents hydrogen or monovalent hydrocarbon radicals having 1 to about 18 carbon atoms, R" is a substituted or unsubstituted divalent hydrocarbon radical having 1 to about 18 carbon atoms, a substituted or unsubstituted divalent hydrocarbonoxy in which the oxygen provides an ether linkage, or an unsaturated divalent hydrocarbon radical, Q represents the radicals:

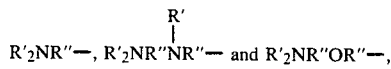

Z is a radical selected from the group consisting of R$_3$SiO$_{0.5}$, and R'$_2$NR"O$_{0.5}$ in which R,R' and R" are the same as above, a is a number having a value of about 0 to about 2, b is a number having a value of about 0 to about 3 and x is a number having a value of about 1 to 20,000. Preferably, R' is hydrogen in which case G is defined as G' and Q is defined as Q'.

Illustrative divalent radicals represented by R" are hydrocarbon radicals having from 2 to 18 carbon atoms such as ethylene, trimethylene, tetramethylene, hexamethylene, octamethylene; hydrocarbonoxy radicals having the formula:

(—OC$_2$H$_4$—)$_r$, (—OC$_2$H$_4$OCH$_2$—)$_r$ and (—OC$_3$H$_6$—)$_r$ in which r is a number having a value of about 1 to about 50, such as ethylene oxide, trimethylene oxide and polymers thereof and alkylene radicals such as vinylene, propenylene, butenylene, hexenylene and the like.

Examples of suitable amino-functional silanes include but are not limited to beta-aminopropyltriethoxysilane, gamma-aminopropyltrimethoxysilane, methyl-beta-(aminoethyl)gamma-aminopropyldimethoxysilane, omega-aminohexyltributoxysilane, beta-(aminoethoxy)-hexyltriethoxysilane, beta-(aminopropoxy)butyltributoxysilane, methyl-beta-(aminopropoxy)propyldi-(aminoethoxy)silane, and the like.

Illustrative amino-functioanl siloxanes are compounds having the formulas:

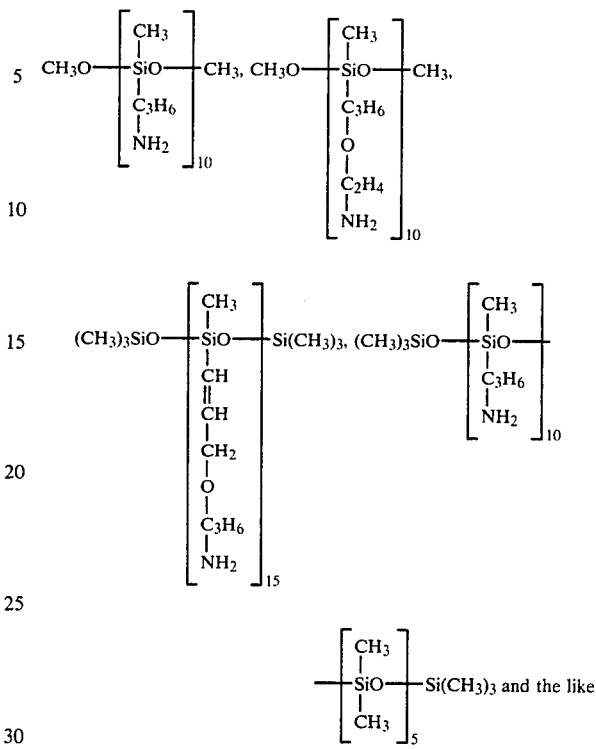

Useful amino-functional dialkylpolysiloxanes and methods for preparing them are described in U.S. Pat. Nos. 3,980,269, 3,960,575 and 4,247,330 whose pertinent disclosures are incorporated herein by reference.

Particularly preferred water-insoluble amino-functional dialkylpolysiloxane fluids are amino-functional dimethylpolysiloxanes that hydrolyze in the presence of water.

An illustrative silicone fluid that is particularly preferred is an amino-functional dimethylpolysiloxane sold under the trademark SILICONE FLUID F-784 by SWS Silicones Corporation, Adrian, Mich. According to the supplier's Product Information Bulletins, F-784-063080 and F-784-121776 and Material Safety Data Sheet F-784-101978-S, the pertinent disclosures of which are incorporated herein by reference, this organopolysiloxane has a specific gravity value of 0.974 (compared to water as 1.00); a viscosity value of 50 cs. at 25 degrees C. (77 degrees F.); a flash point of 62 degrees C. (144 degrees F.) determined by the well-known Pensky-Martens Closed Cup Tester method described in the American Society for Testing and Materials (ASTM) Method D-93 found in the 1980 Annual Book of ASTM Standards, Part 23, published by the ASTM, a base equivalent of 0.45 milliequivalents of base per gram of fluid; and has a relatively slow rate of hydrolysis.

Another preferred amino-functional dimethylpolysiloxane is sold under the trademark SF-1707 by the General Electric Company, Silicone Products Division, Waterford, N.Y., as a 75 percent active solution in mineral spirits. This silicone fluid is reported as having a specific gravity value of about 0.91 at 25 degrees C. (77 degrees F.), a viscosity value of about 50 to about 150 cp. at 25 degrees C. (77 degrees F.), a refractive index value of 1.410 at 25 degrees C. (77 degrees F.), a closed cup flash point of 41 degrees C. (105 degrees F.), and hydrolyzes rapidly in the presence of water.

Still other illustrative amino-functional dimethylpolysiloxanes are the curable silicone fluids sold under the trademark Dow Corning 531 and 536 Fluids by the Dow Corning Corporation of Midland, Mich. According to the supplier's technical information sheet, "Information about Polish Ingredients", Form No. 22-240B-82, published in 1982, the pertinent disclosures of which are incorporated herein by reference, these fluids hydrolyze rapidly when placed in intimate contact with water. These silicone fluids usually contain about 50 to 100 percent by weight silicone fluid, with the diluent, if any, being a mixture of aliphatic hydrocarbon and isopropyl alcohol.

Silicone fluids containing aminoalkylpolysiloxanes that have reactive primary and/or secondary amino groups are particularly preferred for the purposes of this invention. An illustrative, particularly preferred silicone fluid is that sold under the trademark Silicone Fluid F-751 by the SWS Silicones Corporation, Adrian, Mich. According to the supplier's Product Information Bulletin, F-751-042371, the pertinent disclosures of which are incorporated herein by reference, this silicone fluid has a specific gravity value of 0.978, a viscosity value of 200-300 cs., a flash point of 110 degrees C. (230 degrees F.) determined by Cleveland Open Cup (COC) ASTM D-92 Method, and has the same reactivity as a primary amine.

The amino-functional silicone fluids are present in the compositions of this invention in an amount of about 0.5 to about 5.0 parts by weight, preferably about 2.0 to about 3.0 parts by weight, on the basis of the total composition. More preferably, the foregoing silicone polymers are present in combination with a liquid hydrocarbon polymer film-forming agent.

Other useful film-forming agents are curable resins, such as silicone resins and cyclized rubber.

A particularly useful curable silicone resin is sold under the trademark, SR-107 SILICONE ADDITIVE, by the General Electric Company, Silicone Products Division, Waterford, N.Y. This silicone resin is available at 60 weight percent in a solvent mixture of Aromatic 150 and aliphatic hydrocarbons. According to the supplier's Silicones Product Data Bulletin, dated 4/81, the pertinent disclosures of which are incorporated herein by reference, this silicone resin has a specific gravity value of 1.04 at 25 degrees C. (77 degrees F.), a Brookfield viscosity value of 8-40 centipoise (cp.), and a flash point of 32 degrees C. (90 degrees F.) determined by the Pensky-Martens Method.

A particularly useful cyclized rubber is sold under the trademark ALPEX®C-8415, by the American Hoechst Corporation, Somerville, N.J. This resin is reported to have a melting point of about 115 degrees C. to about 127 degrees C. and be soluble in aliphatic and aromatic solvents. Mineral spirits are preferably used as the solvent.

The curable resins are present in the composition of this invention in an amount of about 0.1 to about 0.5 parts by weight, preferably about 0.1 to about 0.3 parts by weight, on the basis of the total composition. More preferably, the curable resins are present in combination with a liquid hydrocarbon polymer film-forming agent.

A useful film-forming agent is a liquid hydrocarbon polymer that is a poly(alpha-olefin) prepared from normal alpha-olefins having a total of 5 to 20 carbon atoms, inclusive, preferably 5 to 14 carbon atoms, inclusive, in the mono-olefin molecule according to the manner of U.S. Pat. No. 2,937,129 to Garwood, incorporated herein by reference.

A particularly preferred liquid hydrocarbon polymer, obtained by the polymerization of dodecene-1 according to the procedure of Example 3 of U.S. Pat. No. 2,937,129, is commercially available under the trademark VYBAR ® 825 from the BARECO ® Division of Petrolite Corporation, Tulsa, Okla. According to the supplier's Product Data Release No. 500.3, dated April, 1982, the pertinent disclosures of which are incorporated herein by reference, the polymer is described as having a density of 0.86 grams per cubic centimeter (cc) at 24 degrees C. (75 degrees F.) determined by ASTM D-1168 Method, a viscosity value of 2800 cp at 10 degrees C. (50 degrees F.) by ASTM Method C-2669 and 530 cp. at 38 degrees C. (100 degrees F.) by ASTM Method D-3236.

Liquid hydrocarbon polymer is preferably present in an amount of about 0.1 to about 1.0 parts by weight, more preferably about 0.3 to about 0.7 parts by weight of the total composition.

The present cleaner/polish compositions also contain on the basis of the total composition about 0.2 to about 0.5 parts by weight, preferably about 0.3 to about 0.4 parts by weight, of at least one film plasticizer selected from the group consisting of polyoxy($C_2$-$C_4$)alkylenes having an average of about 4 to about 90,000, preferably about 9 to about 40, oxyalkylene units per molecule and microcrystalline hydrocarbon waxes.

A particularly preferred polyoxy($C_2$-$C_4$)alkylene is a polyoxypropylene glycol having an average of 20 oxypropylene units per molecule, corresponding to Chemical Abstracts Service (CAS) Registry No. 25322-69-4. This plasticizer is identified in the CTFA Cosmetic Ingredient Dictionary (hereafter *CTFA Dictionary*), Third Edition, published by the Cosmetic, Toiletry and Fragrance Association, Inc. (1982), by the adopted name PPG-20, hereafter "*CTFA adopted name*", incorporated herein by reference. A number of suppliers for PPG-20 can be found in the *CTFA Dictionary*, and a particularly preferred illustrative material is available under the designation P-1200 sold by Dow Chemical USA, Midland, Mich.

Microcrystalline hydrocarbon waxes, useful herein, can be obtained from petroleum wastes or from plant chlorophyll. These waxes typically have a molecular weight of about 40 to about 800 and a crystal particle size in the range of about 2.5 to about 500 nanometers. Thus, it has been found that small amounts of no more than 0.5 weight percent microcrystalline wax can be present as a film plasticizer in the compositions of this invention without changing the substantially clear characteristic of the product.

A particularly preferred microcrystalline wax is sold under the trademark STARWAX ® 100 by the BARECO ® division of the Petrolite Corporation, Tulsa, Okla. According to that supplier's Product Data Release No. 300 (1982), the disclosures of which are incorporated herein by reference, the wax is obtained from the solvent crystallization of a selected petroleum fraction and consists of n-paraffinic, branched paraffinic, and napthenic hydrocarbons having about 36 to about 60 carbon atoms in the hydrocarbon chain. This material is a high-melting hard microcrystalline wax having a penetration hardness value of 16, measured at a depth of 0.1 millimeters by ASTM D-1321 Method at 77 degrees C. (77 degrees F.), and has a melting point of 86 degrees C. (187 degrees F.), determined by ASTM D-127 Method.

The present cleaner/polish compositions also contain in the total composition about 5 to about 15 parts by weight of at least one volatile organopolysiloxane gloss agent selected from the group consisting of substantially linear fully alkylated and trialkylsilyl endblocked polysiloxanes and cyclic dialkylpolysiloxanes, where the alkyl group contains 1 to 3 carbon atoms.

It is to be understood that so-called volatile silicones have a measurable vapor pressure under ambient atmospheric conditions and decrease in volatility as their molecular weight increases. A description of volatile silicones of the type useful herein and their vapor pressure values is found in Todd and Byers, "Volatile Silicone Fluids for Cosmetic Formulations", *Cosmet & Toilet.*, Vol. 91, pages 27–32, January, 1976, incorporated herein by reference.

Illustrative substantially linear volatile silicone fluids particularly useful herein are the fully methylated polysiloxanes endblocked with trimethylsilyl units having the formula:

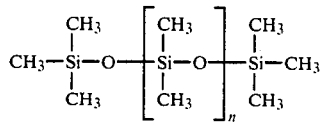

where n=0 to 1,000. The silicones correspond to CAS Registry Nos. 9006-65-9, 9016-00-6 and 63148-62-9, and are identified by the *CTFA adopted name*, dimethicone. Particularly suitable dimethicones are sold under the trademarks, DOW CORNING 200 FLUID by Dow Corning Corporation, Midland, Mich., SILICONE FLUID SWS-101 by the SWS Silicones Corporation, Adrian, Mich., and SILICONE L-45 by the Union Carbide Corporation, Danbury, Conn.

Useful dimethicones are available from the foregoing manufacturers with kinematic viscosity values ranging from about 0.65 cs. to up to above 1,000,000 cs. measured at 25 degrees C. (77 degrees F.). Dimethicones are typically differentiated from one another by their viscosity value in the ingredient listing of the composition. A dimethicone having a viscosity value of 500 cs. is believed to contain about 155 dimethylsiloxy units per molecule, and at a viscosity value of over 1,000,000 cs., the number of dimethylsiloxy units per molecule is believed to be over 680.

For purposes of this invention, dimethicones having a kinematic viscosity of about 100 to about 100,000 cs., preferably about 350 to about 60,000 cs. measured at 25 degrees C. (77 degrees F.) are utilized. More preferably, the compositions of this invention contain a mixture of a dimethicone having a viscosity value of about 350 cs., a dimethicone having a viscosity value of about 1,000 cs., a dimethicone having a viscosity value of about 10,000 cs., and a dimethicone having a viscosity value of about 60,000 cs. It is particularly preferred that the dimethicone having a viscosity value of 350 cs. be present at about an equal weight ratio to the dimethicone having a viscosity value of 10,000 and be blended therewith for incorporation into the product.

A particular preferred dimethicone series, DOW CORNING 200 FLUIDS, are typically described by their supplier as having a specific gravity value of about 0.960 to about 0.971 at 25 degrees C. (77 degrees F.), an open cup flash point of 318 degrees C. (605 degrees F.) at a viscosity value of 50 cs., and about 327 degrees C. (620 degrees F.) at higher viscosity values.

Another useful volatile silicone is a hydrophobic, cyclic polydi($C_1$-$C_3$)alkylsiloxane having an average of about 3 to 7, preferably about 4 to 5 polydi($C_1$-$C_3$)alkylsiloxy groups per molecule. These trimer, quadramer, pentamer, hexamer and heptamer silicones conform to the CTFA adopted name, cyclomethicone, and CAS Registry No. 69430-24-6. A particularly useful pentamer is a decamethylcyclopentasiloxane sold under the trademark SILOXANE F-222 by the SWS Silicones Corporation, Adrian, Mich. According to the supplier's Product Information Bulletin, F-222-051083 and Material Safety Data Sheet, F-222-031783-S, the pertinent disclosures of which are incorporated herein by reference, this pentameric cyclomethicone has a specific gravity of 0.95 at 25 degrees C. (77 degrees F.), a viscosity value of 4 cs. at 25 degrees C. (77 degrees F.), and a flash point of 157 degrees F., by Tag Closed Cup (TCC) ASTM Method D56.

Other exemplary tetramer and pentamer materials are commercially available under the respective designations Dow-Corning 344 and 345 fluids, from Dow-Corning Corporation, Midland, Mich. Other commercial suppliers of cyclomethicones can be found in the CTFA Dictionary.

The exact choice of individual organopolysiloxane fluid or combination of dimethicone and cyclomethicone will depend upon the identity of the metal surface to be cleaned and polished. It has been found that a combination mixture of the foregoing volatile silicones and liquid film-forming agents above described, is particularly advantageous for treatment of metal surfaces, such as those provided by an automobile finish, with cleaner/polish compositions of this invention.

The non-aqueous, cleaner/polish compositions of this invention are used in the form of a solvent-based gel or viscous liquid, as previously defined. Suitable aliphatic organic solvents commonly employed in the metal polishing arts are well known.

In a preferred embodiment, a solvent cleaning agent that is a substantially de-aromatized aliphatic organic solvent is present in sufficient amount to dissolve the abovedescribed microparticulate amorphous silica polishing and thickening agent, the film-forming agent, the film plasticizer and the volatile organopolysiloxane.

It is preferred that solvents utilized herein have a refractive index value in the range of about 1.3 to about 1.5, preferably in the range of about 1.4 to 1.48, more preferably near the refractive index of the microparticulate silica as described hereinabove. It is further preferred that useful solvents have an average kauri-butanol value of about 20 to about 50.

The solvent power of hydrocarbons is expressed in terms of kauri-butanol values, a term well-known to those skilled in the art. Methods of determining the kauri-butanol values are also well-known and need not be described herein. Exemplary solvents that are particularly preferred herein include mineral spirits, de-aromatized odorless light petroleum hydrocarbons that are chiefly paraffinic, isoparaffinic or naphthenic in nature, naphtha, such as V.M.&P. naphtha, deodorized kerosene, mineral seal type oil, Stoddard solvent, and butoxy ethanol.

A particularly useful mineral spirits is a grade of petroleum naphtha that is a hydrotreated heavy grade naphtha corresponding to CAS Registry No.

64742-48-9, reported as having a solvent power and a boiling range typical of a Stoddard solvent and sold under the trademark VARSOL® 1 by the Exxon Company, U.S.A., Houston, Tex. This solvent is described in the 1983 Exxon Petroleum Solvent Bulletin, Lubetext DG-1P (hereafter 1983 DG-1P), the pertinent disclosures of which are incorporated herein by reference, as having a kauri-butanol number of 37 determined by ASTM D-1133 Method, a specific gravity value of 0.791 at 15.6 degrees C. (60 degrees F.) by ASTM D-1250 Method, a viscosity value of 0.95 cp. at 25 degrees C. (77 degrees F.) by ASTM Method D-445, a flash point of 42 degrees C. (108 degrees F.) by TCC Method, and a boiling range between 156-202 degrees C. (313-395 degrees F.) determined by ASTM Method D1076.

Particularly preferred solvents useful herein are odorless light petroleum hydrocarbons that meet the requirements of the U.S. Food and Drug Administration regulations found in Title 21 of the Code of Federal Regulations (CFR), articles 172.884 and 178.3650, incorporated herein by reference. These solvents are highly refined mixtures of liquid hydrocarbons derived from petroleum or synthesized from petroleum gases and are chiefly paraffinic, isoparaffinic or naphthenic in nature.

An exemplary useful odorless light petroleum hydrocarbon is a hydrotreated light petroleum distillate corresponding to CAS Registry No. 64742-47-8 sold under the designation, Low Odor Paraffin Solvent (hereafter LOPS) by the Exxon Company, U.S.A., Houston, Tex. This solvent is described by the supplier in the 1983 DG-1P bulletin as a wide-cut aliphatic solvent that is, in effect, a high purity deodorized or de-aromatized kerosene, having a kauri-butanol number of 29 by ASTM Method D-1133, a specific gravity value of 0.794 at 15.6 degrees C. (670 degrees F.) by ASTM Method D-1250, a viscosity value of 1.69 cp. at 25 degrees C. (154 degrees F.) by TCC, ASTM Method D56, and a boiling range between 191 and 244 degrees C. (375 and 472 degrees F.) determined by ASTM Method D86.

Another particularly useful odorless light petroleum hydrocarbon is an aliphatic solvent sold under the trademark EXXSOL D100 by the Exxon Company, U.S.A., Houston, Tex. This solvent is described by the supplier in its 1984 brochure, High-Purity Aromatized Solvents EXXSOL D80 and EXXSOL D100, Lubetex DP-1P, the pertinent disclosures of which are incorporated herein by reference, as having a kauri-butanol number of 27 by ASTM Method D1133, a specific gravity value of 0.805 at 15.6 degrees C. (60 degrees F.) by ASTM Method D1298, a refractive index value of 1.445 at 20 degrees C. (68 degrees F.), a viscosity value of 3.36 cs. at 20 degrees C. (68 degrees F.) by ASTM Method D445, a flash point of 102 degrees C. (216 degrees F.) determined by Pensky-Martens Method, and a boiling range between 232-273 degrees C. (450-523 degrees F.) by ASTM Method D86. The mass composition of EXXSOL D100 solvent is reported to be 0.9 percent aromatics, 43 percent naphthenes and 56 percent paraffins determined by gas chromatography analysis.

The compositions of this invention may be compounded by techniques well known in the metal polishing art.

The compositions of this invention may also include ingredients known in the polishing art, as used for their commonly employed purpose, so long as the product as compounded remains substantially visually clear.

Surprisingly, it has been found that the above-described microparticulate silica, notwithstanding its finely divided nature, is useful as the principal mildly abrasive polishing agent, as well as the principal thickening agent, in compositions of this invention. The mechanism of this is not fully understood, however. It is known, however, that hydrophilic microparticulate silicas may interact with the dispersion media to form a thixotropic gel or sol that is mechanically destroyed under pressure. A discussion of the behavior of AEROSIL® silica in organic liquids is found in Kasper, et al., *Pharmac. Acta Helvetiae,* 37, pages 48, 73 and 133 (1962), the disclosures of which are incorporated herein by reference, to the extent pertinent.

While inventor does not wish to be bound by any specific theory, it is believed that such an interaction may occur in compositions of this invention, and that the pressure applied during the use of the product thereby releases some of the silica making it available as a microparticulate mild buffing abrasive. Thus, it is believed that as the product's volatile components evaporate, the concentration of the silica in the coating at the substrate surface-product interface increases sufficiently to provide a mild abrasive action during the application of the product and the wiping off of the faintly whitened hazy coating from the surface.

It is further believed that the microparticulate silica may also interact with reactive amine functional groups present in amino-functional dialkylpolysiloxanes discussed hereinbefore to form a silicone bonded mild abrasive. The preferred microparticulate silica contains silanol groups on its surface that have a strong tendency to hydrogen bond with amines. It is, therefore, believed that this interaction may result in a new and unexpected increase in the metal-bonding efficiency of these film-forming agents with the substrate being polished.

Surprisingly, it has also been found that unlike prior experience with conventional wax-containing products, best results are obtained with a composition of this invention when a relatively thin coat of polish is applied to the substrate. Applying more than a thin coat does not improve the result, and may even cause streaking. A "thin coat" is defined herein as an amount of product sufficient to substantially wet and cover the surface area being cleaned and polished. This usually corresponds to a relatively small amount of approximately 2 to about 4 grams over a surface area of about 2 square feet applied by spreading it over the area with a circular and overlapping motion.

The cleaner/polish composition of this invention is utilized by placing a small amount of about 2 to about 4 grams on a first soft cloth applicator, made of cotton, flannel, linen, polyester, non-woven synthetic fiber cloth or the like. The size of the applicator is a matter of personal choice and convenience.

Where the product has the consistency of a gel, the product may be applied to the applicator cloth by using the applicator to scoop the product from the container or by using a wooden or plastic spatula to remove the product from the container and transferring it to the applicator. Where the product has the consistency of a viscous liquid, the product may be shaken or stirred prior to pouring it from its container to resuspend microparticulate settling, if any.

The product is applied in a thin layer onto the substrate surface to be cleaned and polished by spreading the applied amount with the applicator using a circular overlapping stroking motion to provide a substantially clear relatively thin coating thereon. In polishing an automobile finish, it is preferred that the auto finish be clean of major soils and is substantially dry prior to the application of a cleaner/polish of this invention.

The applied coat is allowed to dry on the surface under ambient atmospheric temperature and humidity conditions for a period of time sufficient for the substantially clear coating to develop a faint whitening haze. The resulting faintly whitened, hazy coating is then immediately wiped from the surface with a second soft cloth, preferably a flannel cloth, with substantially no heavy rubbing pressure. The foregoing steps are repeated over each area of the metal object until the entire substrate surface area is substantially cleaned and polished to a durable, detergent-resistant high gloss finish.

As used herein, the word "wiping" in its various grammatical forms is meant to indicate removal of the applied thin coat of cleaner/polish composition without substantial heavy pressure being exerted against the substrate to be cleaned and polished. The word "rubbing" in its various grammatical forms is used herein to indicate the exertion of a substantial pressure against the substrate to be polished normally associated with the removal of excess cleaner/polish composition and the achieving of high gloss when using conventional paste and emulsion polishes.

The relative speed, ease and smoothness and absence of sag or dripping with which the polish composition of this invention can be applied to an automobile to obtain a superior cleaned and polished finish is yet another of the salient benefits of this invention.

This invention is further illustrated in the following examples, which are intended as exemplifying the invention and are not to be taken as limiting.

EXAMPLE 1

Liquid Automobile Cleaner/Polish Compositions

Substantially clear liquid automobile cleaner/polish compositions were prepared from the following components:

| Components | Parts by Weight in Formula (Active Basis) | | | |
|---|---|---|---|---|
| | A | B | C | D |
| 1. Mineral spirits to 100 parts by weight | q.s. | q.s. | q.s. | q.s. |
| 2. Odorless light petroleum hydrocarbon, wide-cut (note a) | 10.0 | 10.0 | 10.0 | 10.0 |
| 3. Liquid poly(alpha-olefin) (note b) | 0.6 | 0.6 | 0.6 | 0.3 |
| 4. Cyclized rubber (note c) | — | — | — | 0.2 |
| 5. PPG-20 (note d) | 0.4 | 0.4 | 0.4 | 0.4 |
| 6. Dimethicone (note e), 350 cs. | 0.8 | 0.8 | 0.8 | 2.2 |
| 7. Dimethicone (note e), 10,000 cs. | 0.8 | 0.8 | 0.8 | — |
| 8. Dimethicone (note e), 1,000 cs. | 4.0 | 4.0 | 4.0 | — |
| 9. Dimethicone (note e), 60,000 cs. | 0.5 | 0.5 | 0.5 | — |
| 10. SILICONE FLUID F-751 (note f) | 1.0 | 1.0 | 1.0 | 1.1 |
| 11. Cyclomethicone (note g) | 3.4 | 3.4 | 3.4 | 3.3 |
| 12. SR 107 SILICONE ADDITIVE (note h) | 0.2 | 0.2 | 0.2 | 0.3 |
| 13. SF 1707 (note i) | 0.6 | 0.6 | 0.6 | 0.6 |
| 14. Odorless light petroleum hydrocarbon, narrow-cut (note j) | 0.8 | 0.9 | 0.8 | 0.8 |
| 15. Microcrystalline wax (note k) | — | — | — | 0.5 |
| 16. AEROSIL ® 200 (note l) | 4.0 | 4.4 | 5.0 | 4.4 |

(note a) LOPS, Exxon Company U.S.A.
(note b) BARECO ® VYBAR ® 825, Bareco Div., Petrolite Corp.
(note c) ALPEX ® C-8415, American Hoechst Corporation
(note d) POLYGLYCOL P-1200, Dow Chemical USA
(note e) DOW CORNING 200 FLUID, Dow Corning Corporation
(note f) SWS Silicones Corporation
(note g) SILOXANE F-222, SWS Silicones Corporation
(note h) 60 percent solution in mineral spirits supplied by General Electric Company, Silicone Products Division
(note i) 75 percent solution in mineral spirits supplied by General Electric Company, Silicone Products Division
(note j) EXXSOL D 100, Exxon Company U.S.A.
(note k) STAR WAX ® 100, Bareco ® division, Petrolite Corporation
(note l) Degussa Corporation, Pigments Division Formulas A, B, and C were prepared by charging components 1-5 into a stainless steel vessel in the order shown and dispersing them under ambient room temperature and humidity with mixing agitation until the mixture was substantially homogenous. In a second stainless steel vessel, Components 6 and 7 were blended together in the order shown with mixing agitation to form a substantially homogenous blend. This blend was then charged into the first vessel containing Components 1-5 and dispersed with mixing agitation until the mixture as substantially homogeneous. Components 8-14 were then charged in the order shown into the foregoing mixture and dispersed with mixing agitation therein. Component 16 was added gradually to the mixture of Components 1-14, and mixed in with sufficient shearing agitation to form a substantially clear, viscous liquid.

The liquid was homogenized at 2000 pounds pressure per square inch (psi) using a Gavlin Homogenizer. The products of this Example were substantially visually clear viscous liquids having a Brookfield viscosity of about 50,000 cp.

Formula D was similarly prepared, except that the microcrystalline wax (component 15) was predissolved in a portion of the mineral spirits (component 1) prior to adding it to the mixture of components 1-14. This was accomplished by dispersing one part component 15 at a temperature of about 93 degrees C. in two parts component 1 until a clear solution was obtained. This solution was cooled to ambient room temperature with mechanical agitation and then added to the mixture of components 1-14, prior to adding in component 16. The viscosity and appearance of composition D was otherwise substantially similar to that of compositions A, B and C.

The hood surface area of an automobile was cleaned and dried. Composition B was applied in a relatively small amount onto an area of about 8 inches × 12 inches and permitted to dry to a faint whitening haze. The haze was wiped off and the area was polished with a soft flannel cloth until glossy.

After a period of about 18 to about 24 hours, the initial gloss was subjectively noted. The polished area was washed with a commercial aqueous car washing detergent according to the manufacturer's instructions, stroking the area with detergent 10 times, rinsing the washed area with water and allowing the rinsed area to dry in ambient air. The washed area was re-washed in the same manner four more times for a total of five washings. The final gloss was again noted to assess its detergent resistance.

Composition B achieved a good initial gloss with a relatively low degree of paint stripping noted during the polishing step, based on an examination of the used cloth applicator. Based on the final gloss good detergent resistance was noted.

Composition D produced similar results when it was applied in the same manner on a separate hood surface area.

EXAMPLE 2

Clear Gel Cleaner/Polish Composition

A substantially clear gel cleaner/polish composition was prepared from the following components according to the method for Composition A of Example 1.

| Components | Parts by Weight in Formula (Active Basis) | | |
|---|---|---|---|
|  | A | B | C |
| 1. Mineral spirits to 100 parts | q.s. | q.s. | q.s. |
| 2. Odorless light petroleum hydrocarbon, wide-cut (note a, Example 1) | 10.0 | 10.0 | 10.0 |
| 3. Liquid poly(alpha-olefin) (note b, Example 1) | 0.7 | 0.7 | 0.7 |
| 4. PPG20 (note d, Example 1) | 0.4 | 0.4 | 0.4 |
| 5. Dimethicone (note e, Example 1) 350 cs. | 0.8 | 0.8 | 0.8 |
| 6. Dimethicone (note e, Example 1) 10,000 cs. | 0.8 | 0.8 | 0.8 |
| 7. Dimethicone (note e, Example 1) 1,000 cs. | 4.2 | 4.2 | 4.2 |
| 8. Dimethicone (note e, Example 1) 60,000 cs. | 0.6 | 0.6 | 0.6 |
| 9. SILICONE FLUID F751 (note f, Example 1) | 1.1 | 1.1 | 1.1 |
| 10. Cyclomethicone (note g, Example 1) | 3.6 | 3.6 | 3.6 |
| 11. SILICONE FLUID F784 (note m) | 1.0 | 1.0 | 1.0 |
| 12. SR 107 SILICONE ADDITIVE (note h, Example 1) | 0.2 | 0.2 | 0.2 |
| 13. SF 1707 (note i, Example 1) | 0.7 | 0.7 | 0.7 |
| 14. Odorless light petroleum hydrocarbon, narrowcut (note j, Example 1) | 0.9 | 0.9 | 0.9 |
| 15. AEROSIL ® 200 (note l, Example 1) | 7.0 | 7.5 | 8.0 |

(note m) SWS Silicones Corporation

The products of this example were substantially visually clear thixotropic gels each having a Brookfield viscosity of about 300,000 cp.

Composition B achieved results similar to those of Composition B of Example 1 with regard to good initial gloss, relatively low paint stripping and good detergent resistance in a similar hood surface evaluation.

The present invention has been described with respect to preferred embodiments. It will be apparent to those skilled in the art that modifications and/or variations of the disclosed compositions and methods can be made without departing from the scope of the invention set forth herein.

What is claimed is:

1. A non-aqueous, substantially clear cleaner-polish composition comprising per 100 parts by weight of the compositoin:

(a) about 3 to about 10 parts by weight of a mildly abrasive polishing and thickening agent that is a microparticulate, amorphous, hydrophilic pyrogenic silica having an average primary particle size in the range of about 3 to about 50 nanometers, an external BET surface area of about 50 to about 500 square meters per gram, an internal surface area that is substantially nil and a silicon dioxide content of greater than 99.8 percent, said polishing and thickening agent also being an auxiliary cleaning agent;

(b) about 0.1 to about 5 parts by weight of at least one liquid film-forming agent that is selected from the group consisting of amino-functional dialkylpolysiloxanes, curable resins, and liquid hydrocarbon polymers obtained from mono-olefins having 3 to 20 carbon atoms, inclusive, in the olefin molecular;

(c) about 0.2 to about 0.5 parts by weight of at least one film plasticizer for said film-forming agent selected from the group consisting of polyoxy($C_2$–$C_4$)alkylenes having an average of about 4 to about 90,000 oxyalkylene units per molecular and microcrystalline hydrocarbon waxes;

(d) about 5 to about 15 parts by weight of at least one volatile organopolysiloxane gloss agent that is selected form the group consisting of linear fully alkylated and trialkylsilyl endblocked polysiloxanes and cyclic dialkylpolysilocanes where the alkyl group contains 1 to 3 carbon atoms, inclusive; and (e) an aliphatic substantially de-aromatized organic solvent cleaning agent present in sufficient amount to dissolve said polishing and thickening agent, said film-forming agent, and said film plasticizer, said solvent having an average kauri-butanol value of about 20 to about 50 and a refractive index value of about 1.3 and about 1.5, and said organopolysiloxane gloss agent being compatible with said liquid film-forming agent to produce a substantially visually clear composition.

2. The composition of claim 1 wherein the polishing and thickening agent has an average particle size of about 7 to about 20 nanometers and an external BET surface area of about 90 to 425 square meters per gram.

3. The composition of claim 1 wherein the polishing and thickening agent has an average particle size of 12 nanometers and an external BET surface area of about 175 to about 225 square meters per gram.

4. The composition of claim 1 wherein the film-forming agent is an amino-functional dialkylpolysiloxane selected from the group consisting of water-insoluble, water-hydrolyzable and reactive amino-functional silicone fluids.

5. The composition of claim 1 wherein the film-forming agent is a liquid poly(alpha-olefin) obtained from normal alpha-olefins having 5 to 20 carbons, inclusive, in the olefin group.

6. The composition of claim 1 wherein the film-forming agent is a curable resin selected from the group consisting of curable silicone resins and cyclized rubbers.

7. The composition of claim 1 wherein the film plasticizer is a polyoxypropylene glycol having an average of about 9 to about 40 oxypropylene groups per molecule.

8. The composition of claim 1 wherein the film plasticizer is a microcrystalline hydrocarbon wax, having about 36 to about 60 carbon atoms in the hydrocarbon chain.

9. The composition of claim 1 wherein the gloss agent is a linear, fully methylated trimethylsilyl endblocked polysiloxane having a viscosity in the range of about 350 to about 60,000 centistokes at 25 degrees C. (77 degrees F.).

10. The composition of claim 1 wherein the gloss agent is selected from the silicone polymer group consisting of cyclic ($C_1$-$C_3$)dialkylpolysiloxanes having an average of about 3 to about 7 polydi($C_1$-$C_3$)alkylsiloxy groups per molecule.

11. The composition of claim 1 wherein the aliphatic organic solvent is selected from the group consisting of mineral spirits, de-aromatized odorless light petroleum hydrocarbons that are chiefly paraffinic, isoparaffinic or napthenic in nature, naphtha, deodorized kerosene, Stoddard solvent, and butoxy ethanol.

12. The composition of claim 1 having the consistency of a gel or a viscous, liquid.

13. A non-aqueous, substantially clear cleaner-polish composition comprising per 100 parts by weight of the total composition:
   (a) about 3 to about 10 parts by weight of a microparticulate, amorphous, pyrogenic hydrophilic silica having an average particle size of about 7 to about 20 nanometers, an external BET surface area of about 90 to about 425 square meters per gram and a silicon dioxide content greater than 99.8 percent;
   (b) about 0.1 to about 5 parts by weight of at least one liquid film-forming agent selected from the group consisting of amino-functional dialkylpolysiloxanes, curable resins, liquid hydrocarbon polymers obtained from mono-olefins having 3 to 20 carbon atoms, inclusive, in the mono-olefin moelcule, and mixtures thereof;
   (c) about 0.2 to about 0.5 parts by weight of at least one film plasticizer for said film-forming agent selected from the group consisting of polyoxy($C_2$-$C_4$)alkylenes having an average of about 9 to about 40 oxyalkylene units per molecule and microcrystalline hydrocarbon waxes;
   (d) about 5 to about 15 parts by weight of at least one volatile organopolysilocane gloss agent selected from the group consisting of linear fully methylated trimethylsilyl endblocked polysilocanes having a viscosity value of about 350 and about 60,000 centistokes at 25 degrees C. (77 degrees F.) and cyclic dimethylpolysiloxanes having an average of 3 to 7 polydimethylsiloxy groups per molecule; and
   (e) an aliphatic substantially de-aromatized organic solvent cleaning agent present in sufficient amount to dissolve said polishing and thickening agent, said film-forming agent, said film plasticizer, and said gloss agent, said solvent being selected from the group consisting of liquid hydrocarbons derived from petroleum, mineral spirits, naptha, deodorized kerosene and mixtures thereof, said solvent having an average kauri-butanol value of about 20 to about 50 and a refractive index value of about 1.3 to about 1.5, and said liquid film-forming agent being compatible with said gloss agent to produce a substantially visually clear composition.

* * * * *

UNITED STATES PATENT AND TRADEMARK OFFICE
CERTIFICATE OF CORRECTION

PATENT NO. : 4,665,116
DATED : May 12, 1987
INVENTOR(S) : Harvey Kornhaber, James P. Heidel, Stephen I. Varga It is certified that error appears in the above-identified patent and that said Letters Patent is hereby corrected as shown below:

Column 3, line 18:

After the word "the", the number "25" should be deleted.

Column 10, line 34:

The number "3,980,269" should be --3,890,269--.

Column 20, line 12:

The word "molecular" should be --molecule--.

Signed and Sealed this

Ninth Day of February, 1988

Attest:

DONALD J. QUIGG

Attesting Officer

Commissioner of Patents and Trademarks